United States Patent [19]
Curry et al.

[11] Patent Number: 5,791,982
[45] Date of Patent: Aug. 11, 1998

[54] SYSTEM FOR IMPROVING THE WELL-BEING OF HUMANS IN A COMMERCIAL AIRCRAFT

[75] Inventors: Michael J. Curry, Etobicoke; Alison J. Kuipers, North York; Laurie M. Chappell, Toronto; Paul L. Emmett, North York, all of Canada

[73] Assignee: AlliedSignal Inc., Morristown, N.J.

[21] Appl. No.: 840,324

[22] Filed: Apr. 16, 1997

[51] Int. Cl.$^6$ .................................................. B64D 13/06
[52] U.S. Cl. .......................... 454/74; 244/118.5; 454/76
[58] Field of Search ............................ 454/71, 74, 76; 244/118.5

[56] References Cited

U.S. PATENT DOCUMENTS

| | | | |
|---|---|---|---|
| 4,164,172 | 8/1979 | Anderten et al. | |
| 4,742,761 | 5/1988 | Horstman | 454/74 |
| 5,004,485 | 4/1991 | Hamlin et al. | 55/160 |
| 5,457,963 | 10/1995 | Cahill-O'Brien et al. | 62/78 |
| 5,516,330 | 5/1996 | Dechow et al. | 454/74 |
| 5,590,852 | 1/1997 | Olson | 244/118.5 |
| 5,642,729 | 7/1997 | Cassidy | 128/204.29 |

Primary Examiner—Harold Joyce
Attorney, Agent, or Firm—Larry J. Palguta; John R. Rafter

[57] ABSTRACT

A system (10) for controlling the quality of the cabin air in an aircraft of the type having a cabin air recirculating system (37, 43) which introduces selectable amounts of fresh outside air, an arrangement (25, 27) for venting controllable quantities of cabin air to the atmosphere, and a source of oxygen-rich air (49). The system (10) includes sensors for monitoring the partial pressure of carbon dioxide (15) in the cabin air, the partial pressure of oxygen (17) in the cabin air, the humidity (19) of the cabin air, and the total air pressure (21) of the cabin air, and an air quality controller (23). The air quality controller (23) includes at least four inputs, one input connected to each of the sensors, and at least two outputs, one output connected in controlling relationship to the source (49) of oxygen-rich air and another (47) connected in controlling relationship to the cabin air recirculating system. The air quality controller (23) determines a passenger discomfort level by combining the four inputs and upon detecting a specified value for the passenger discomfort level, actuates at least one output to enable either the source (49) of oxygen rich air to increase the partial pressure of oxygen in the cabin air, or the recirculating system (43, 37) to increase the introduction of fresh outside air thereby reducing the partial pressure of carbon dioxide in the cabin air. The system (10) may optionally also increase the cabin air humidity when the monitored humidity falls below a predetermined minimum. The air quality controller (23) also responds to the monitored total air pressure of the cabin air to modify the quantity of air vented to the atmosphere to maintain the total cabin air pressure within prescribed limits.

19 Claims, 1 Drawing Sheet

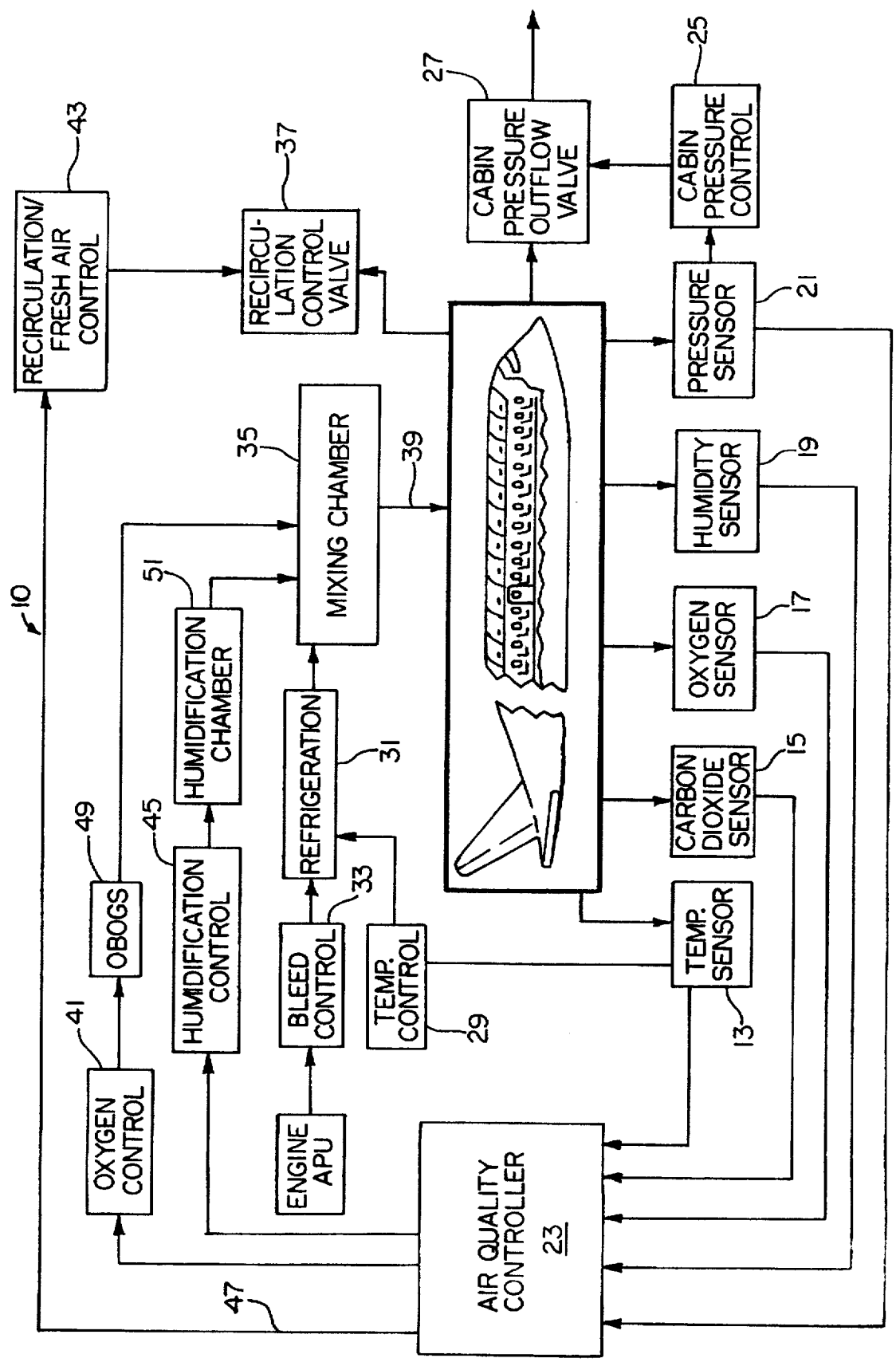

SYSTEM FOR IMPROVING THE WELL-BEING OF HUMANS IN A COMMERCIAL AIRCRAFT

The present invention relates generally to methods and apparatus for controlling the atmospheric constituents in an enclosed environment, and more especially to such methods and apparatus for controlling the quality of the air which is partially recirculated, and partially replenished with ambient air, in an enclosed human environment such as an automobile, airplane or similar cabin. In one embodiment, the quality of the cabin air is maintained by removing excess carbon dioxide and supplying make-up oxygen while controlling the cabin air pressure, temperature and humidity (partial pressure of water vapor). The primary thrust of the present invention is not simply to maintain life support levels within the cabin; it is to maintain levels which ensure passenger comfort.

Recently, the subject of aircraft cabin air quality has been receiving a lot of attention from the media, flight attendant groups and the frequent flying public. Some passengers experience nausea, fatigue, faintness, headaches or other undesirable symptoms. Several factors have been identified as possible contributors to the sick feeling that some people experience after a long flight, however, none has been proven to be the cause of the problem.

Three medical conditions that occur in various levels of severity in an aircraft cabin are hypoxemia, dehydration and mild decompression sickness.

Hypoxemia is a decreased oxygen saturation of the blood due to insufficient oxygen transfer in the lungs. It is one form of hypoxia, an inadequate supply of oxygen available to the cells. It may be caused by a lowered partial pressure of oxygen in the aircraft cabin. The concentration of oxygen in the air remains constant at about 20.9%, so when the total air pressure is reduced, the partial pressure of oxygen also drops. This causes the quantity of blood-tissue gas exchange to be reduced, because the rate of transfer is proportional to the partial pressure differential between the two sides of the blood-gas barrier. To alleviate this, supplemental oxygen for the pilot and crew at high altitudes has been well known since early in World War II.

Aircraft cabins are kept relatively dry. This is desirable to prevent the decay of the aircraft materials, but does not create an ideal passenger environment. A typical relative humidity value is around 20%. This causes passengers to become dehydrated if they do not ingest enough non-diuretic liquids during the flight.

Mild decompression sickness (called the bends in more severe forms) can occur because of the aircraft's rapid ascent from the ground to an equivalent altitude of, for example, 8000 feet. This rapid pressure reduction forces some of the nitrogen dissolved in the blood to return to a gaseous form. Studies have shown that dehydration, hypoxia and high carbon dioxide levels, all of which can occur in an aircraft cabin, increase the probability of the occurrence of decompression sickness. Decompression sickness may be alleviated by reducing the time rate of change of air pressure or replacement of the nitrogen with helium or other inert gas which is less soluble in blood than nitrogen. Neither of these solutions is well suited to an aircraft cabin environment.

A costly and complex solution to the hypoxemia and decompression sickness problems is to maintain the cabin pressure at or near ground level pressure throughout the flight. However, the aircraft hull is then subjected to substantial pressure differentials at altitude and experiences flexing of the hull as the aircraft climbs or descends which may result in structural failure of the airframe. The aircraft hull may be made stronger to avoid the problems created by such flexing, but at the expense of increased weight and decreased payload.

It is desirable to provide a cabin environment control system which alleviates the hypoxemia, dehydration and decompression sickness problems without inducing the stress on the aircraft structure that lowering the equivalent altitude inside the aircraft cabin would cause, thus avoiding the risk of catastrophic airframe failure. It is also desirable to provide a quantitative measure of the well-being of a human population in a commercial aircraft.

The present invention provides these desirable features and solves the above problems by providing an aircraft cabin air quality control system which recirculates the cabin air within the aircraft cabin, introduces controllable quantities of external air into the cabin air and vents controllable quantities of cabin air to the atmosphere. Make-up oxygen is provided by a source of oxygen-rich air such as a molecular sieve which separates oxygen from other gaseous atmospheric components. When a monitored oxygen level falls below a predetermined minimum, oxygen-rich air from the oxygen-rich air source is introduced into the cabin air. When a monitored level of carbon dioxide exceeds a predetermined maximum, the quantity of external air introduced into the cabin air is increased.

In accordance with another form the invention, a plurality of individual discomfort parameters such as total pressure, either relative humidity or the partial pressure of water vapor, oxygen partial pressure and carbon dioxide partial pressure within the cabin are monitored and a composite measure of the individual discomfort parameters is formed. Certain ones of the individual discomfort parameters are then modified when the composite measure indicates a predetermined passenger discomfort threshold has been exceeded. The modification is in such a way as to cause the composite measure to fall below the predetermined passenger discomfort threshold.

The present invention comprises an aircraft cabin air quality control system comprising:

means for recirculating the cabin air within the aircraft cabin;

means for introducing controllable quantities of external air into the cabin air;

means for venting controllable quantities of cabin air to the atmosphere;

a source of oxygen-rich air;

means for monitoring the amount of carbon dioxide in the cabin air;

means for monitoring the amount of oxygen in the cabin air;

means operable when the monitored amount of oxygen falls below a predetermined minimum for introducing oxygen-rich air from the source of oxygen-rich air into the cabin air; and means operable when the monitored amount of carbon dioxide exceeds a predetermined maximum for increasing the quantity of external air introduced into the cabin air.

BRIEF DESCRIPTION OF THE DRAWING

The drawing Figure is a schematic illustration of a cabin air quality control system illustrating the invention in one form.

DESCRIPTION OF THE PREFERRED EMBODIMENT

In the drawing, an aircraft cabin 11 is illustrated as having a system 10 comprising temperature 13, carbon dioxide partial pressure 15, oxygen partial pressure 17, humidity 19 and total cabin air pressure 21 sensors. Other cabin environmental parameters could be monitored. An air quality controller 23 receives inputs from each of these five sensors and has three outputs. The outputs supply control signals to control the cabin humidity, the ratio of new to recirculated air in the cabin and a cabin air oxygen level enhancing arrangement. Pressure sensor 21 also has an output leading to a cabin pressure control 25 which regulates the total cabin air pressure by adjusting the valve 27 to control the rate at which cabin air is vented to the atmosphere. The temperature sensor 13 also has an output leading to a cabin temperature control 29 which is coupled in controlling relation to an air conditioning (refrigerating) unit 31. Fresh outside air warmed by the engine passes through the bleed control 33 through refrigeration unit 31 and into a mixing or combining chamber 35. The mixing chamber also receives air from the cabin by way of recirculation valve 37. The mixture of recirculated and fresh air is returned to the cabin as indicated at 39. Aircraft ventilation systems that include valves, valve controllers, carbon dioxide sensors, pressure sensors, pressure controllers, air duct arrangements, discrete cabin zones, and conventional microprocessor controls programmed with appropriate control algorithms, are known in the art, such as in U.S. Pat. Nos. 4,742,760 and 4,742,761. Typical microprocessor controllers and the programming of such are well known to those skilled in the art, and it is not necessary to present one herein or to describe in detail typical programming for such controllers, in order to provide a full enabling disclosure of the present invention.

The air quality controller 23 implements an algorithm which reflects the way in which the five input variables (temperature, total pressure, relative or absolute humidity, and the oxygen and carbon dioxide levels) affect the well-being of the human population in the aircraft cabin. Three output signals are generated by the air quality controller, one of which leads to the oxygen control unit 41, a second to the recirculation/fresh air control 43, and a third to the humidification control 45. Of these three, oxygen and carbon dioxide levels are the most important and the humidification feature may optionally be omitted for weight reduction, initial cost reduction or equipment longevity. Oxygen control unit 41 controls the operation of an onboard oxygen generating system ("OBOGS") 49 which generates oxygen from the ambient air by pushing air through a molecular sieve which separates out the nitrogen and other undesirable gases. Because such oxygen generating systems have been designed for aircraft use, they are relatively lightweight.

The recirculation/fresh air control unit 43 receives via line 47 an input signal from the air quality controller and sends its output to the recirculation control valve 37 which controls how much of the air from the cabin is directed back into the mixing chamber 35. The amount of recirculation will be primarily dependent on the carbon dioxide level detected in the aircraft cabin. A decrease in this amount of recirculation will lead to an increase in the amount of new fresh air supplied to the mixing chamber and, thus, to a decrease in carbon dioxide level in the cabin. The mixing or combining chamber 35 combines the fresh air, recirculated air and oxygen deposited into it and proceeds to channel the new blend into the aircraft cabin via line 39 to produce an environment rich in oxygen and low in carbon dioxide. The humidification control 45 also receives a signal from the air quality controller 23. This controls the amount of air diverted around the refrigeration unit 31 and through the humidification chamber 51 to increase the cabin air relative humidity.

Since the five cabin attributes being monitored can all contribute to passenger well-being, they are referred to as discomfort parameters. They could equally well be called passenger comfort parameters since an increase in discomfort is equivalent to a decrease in comfort.

The minimum individual discomfort parameters which need to be monitored are at least oxygen partial pressure and carbon dioxide partial pressure within the cabin. The individual discomfort parameters may further include the humidity, air pressure and temperature within the cabin. The air quality controller may exert control over the additional oxygen based solely on information from the oxygen sensor 17. It may similarly regulate the relative amounts of recirculated and fresh air based only on the carbon dioxide levels in the cabin. Optionally, humidity can also be controlled directly by input information from sensor 19. With a minimal control scheme, oxygen control 41 supplies supplemental oxygen to the cabin air when the monitored oxygen partial pressure falls below a predetermined minimum. Similarly, control 43 is actuated to increase the selected amount of fresh outside air when the monitored carbon dioxide exceeds a predetermined maximum. Numerous other, more complex control schemes are possible. A composite measure of the individual discomfort parameters called a malaise factor may be defined and computed by the air quality controller. Such a malaise factor would be a function of some or all of the monitored cabin parameters with coefficients that reflect the relationship between the physical and physiological factors and how those factors affect the well-being of the population. The system would then modify certain ones of the individual discomfort parameters when the composite measure or malaise factor indicates a predetermined passenger discomfort threshold has been exceeded in such a way as to cause the composite measure to fall below the predetermined passenger discomfort threshold.

The malaise factor may simply be a linear combination of four of the monitored cabin parameters: oxygen partial pressure, water vapor partial pressure, total cabin pressure and possibly the reciprocal of carbon dioxide partial pressure. In this case, smaller values would indicate increasing passenger discomfort. Another malaise factor might be the product of oxygen partial pressure, water vapor partial pressure, and total cabin pressure divided by the monitored partial pressure of carbon dioxide. Again, larger values indicate enhanced passenger comfort. When determining the value of the malaise factor, physiological states must be correlated with the physical parameters that induce them, as illustrated by the following chart:

| Malaise Factor | Condition | Measurable Physiological Sign | Causative Environmental Factors | Measurable Physical Parameters |
|---|---|---|---|---|
| $\Gamma$ | hypoxemia | $SpO_2(t)$ | lowered $O_2$ levels in cabin air supply | $ppO_2$ |
| | mild DCS | intravenous microbubbles | lowered total pressure | $P_T(t)$ |
| | | elevated body temperature | {lowered $O_2$ levels} | $\{ppO_2\}$ |
| | | | {lowered RH} | {RH or $ppH_2O$} |
| | | | {increased $CO_2$ levels} | $\{ppCO_2\}$ |
| | dehydration | net body water loss | low RH of cabin air supply | RH or $ppH_2O$ |
| | | $r(t) = f(ppO_2(t), ppH_2O(t), P_t(t), ppCO_2(t))$ | | |

A minimal control scheme was discussed earlier. A more complex scheme utilizing a malaise factor might involve establishing an oxygen partial pressure threshold which is greater than the predetermined minimum, computing an oxygen discomfort factor indicating the amount by which the oxygen partial pressure threshold exceeds the monitored oxygen partial pressure, establishing a carbon dioxide partial pressure threshold which is less than the predetermined maximum, computing a carbon dioxide discomfort factor indicating the amount by which the monitored carbon dioxide partial pressure exceeds the carbon dioxide partial pressure threshold, and selecting the discomfort parameter having the larger discomfort factor as the one to be corrected when the malaise factor indicates a discomfort threshold has been exceeded.

A further control scheme option operable upon detecting excess discomfort might involve enabling both the source of oxygen rich air to increase the partial pressure of oxygen in the cabin air and the recirculating system to increase the introduction of fresh outside air thereby reducing the partial pressure of carbon dioxide in the cabin air. For example, the ratio of fresh air to oxygen could be proportional to the ratio of the amount by which a predetermined oxygen threshold exceeds the measured partial pressure of oxygen divided by the amount by which the measured carbon dioxide partial pressure exceeds a predetermined carbon dioxide. Other control schemes will be readily apparent.

From the foregoing, it is now apparent that a novel cabin air quality control system has been disclosed meeting the objects and advantageous features set out hereinbefore as well as others, and that numerous modifications as to the precise implementation may be made by those having ordinary skill in the art. For example, equipment longevity is enhanced by low relative humidity levels while passenger comfort suffers. The concern for equipment may prevail and the humidity allowed to remain relatively low, however, the humidity could still be monitored and play a part in controlling the other cabin air parameters. Control units such as 25, 29, 41 and 43 may or may not need to be implemented, depending on the system design. For example, should the oxygen control unit 41 not be needed, the air quality controller output on line 47 would also lead directly to the onboard oxygen generating system 49 and that system would receive input signals commanding it to add the required amount of oxygen to the mixing chamber 35. Two simplistic malaise factors have been suggested. Other, more sophisticated definitions of malaise factors will evolve with experience in correlating the monitored cabin parameters with the associated physiological factors.

What is claimed is:

1. An aircraft cabin air quality control system comprising:
   means for recirculating the cabin air within the aircraft cabin;
   means for introducing controllable quantities of external air into the cabin air;
   means for venting controllable quantities of cabin air to the atmosphere;
   a source of oxygen-rich air;
   means for monitoring the amount of carbon dioxide in the cabin air;
   means for monitoring the amount of oxygen in the cabin air;
   means operable when the monitored amount of oxygen falls below a predetermined minimum for introducing oxygen-rich air from the source of oxygen-rich air into the cabin air; and
   means operable when the monitored amount of carbon dioxide exceeds a predetermined maximum for increasing the quantity of external air introduced into the cabin air.

2. The aircraft cabin air quality control system of claim 1, further comprising means for monitoring cabin air humidity and for increasing the cabin air humidity when the monitored humidity falls below a predetermined minimum.

3. The aircraft cabin air quality control system of claim 1, wherein the source of oxygen-rich air comprises a molecular sieve for separating oxygen from other gaseous atmospheric components.

4. A method of minimizing the discomfort of a group of passengers in an aircraft cabin comprising:
   monitoring a plurality of individual discomfort parameters within the cabin, the individual discomfort parameters including oxygen partial pressure and carbon dioxide partial pressure within the cabin;
   forming a composite measure of the individual discomfort parameters;
   modifying at least one of the individual discomfort parameters when the composite measure indicates a predetermined passenger discomfort threshold has been exceeded in such a way as to cause the composite measure to fall below the predetermined passenger discomfort threshold.

5. The aircraft cabin air quality control system of claim 1, further comprising means for monitoring cabin air pressure and for effecting a change in cabin air pressure, and means for monitoring cabin temperature and for effecting a change in cabin temperature.

6. The aircraft cabin air quality control system of claim 1, wherein the system includes means for combining recirculated air, external air, and oxygen-rich air.

7. The method of claim 4, including the additional steps of establishing an oxygen partial pressure threshold, computing an oxygen discomfort factor indicating the amount by which the oxygen partial pressure threshold exceeds the monitored oxygen partial pressure, establishing a carbon dioxide partial pressure threshold, computing a carbon dioxide discomfort factor indicating the amount by which the monitored carbon dioxide partial pressure exceeds the carbon dioxide partial pressure threshold, and selecting the discomfort parameter having the larger discomfort factor as the one discomfort parameter in the modifying step.

8. The method of claim 4, wherein the individual discomfort parameters further include humidity and air pressure within the cabin.

9. A method of minimizing the discomfort of a group of passengers in an aircraft cabin of the type having a cabin air recirculating system which introduces selectable amounts of fresh outside air comprising:
   monitoring a plurality of individual discomfort parameters including at least oxygen partial pressure and carbon dioxide partial pressure within the cabin;
   supplying supplemental oxygen to the cabin air when the monitored oxygen partial pressure falls below a predetermined minimum; and
   increasing the selected amount of fresh outside air when the monitored carbon dioxide partial pressure exceeds a predetermined maximum.

10. The method of claim 9, further comprising the step of combining recirculated air, outside air, and supplemental oxygen prior to introduction into the cabin.

11. The method of claim 9, wherein the individual discomfort parameters further include humidity, air pressure and temperature within the cabin.

12. The method of claim 9, including the additional steps of forming a composite measure of the individual discomfort parameters; and modifying at least one of the individual discomfort parameters when the composite measure indicates a predetermined passenger discomfort threshold has been exceeded in such a way as to cause the composite measure to fall below the predetermined passenger discomfort threshold.

13. The method of claim 12, including the additional steps of establishing an oxygen partial pressure threshold which is greater than the predetermined minimum, computing an oxygen discomfort factor indicating the amount by which the oxygen partial pressure threshold exceeds the monitored oxygen partial pressure, establishing a carbon dioxide partial pressure threshold which is less than the predetermined maximum, computing a carbon dioxide discomfort factor indicating the amount by which the monitored carbon dioxide partial pressure exceeds the carbon dioxide partial pressure threshold, and selecting the discomfort parameter having the larger discomfort factor as a certain one in the modifying step.

14. In an aircraft having a cabin air recirculating system which introduces selectable amounts of fresh outside air, a system for controlling the quality of the cabin air comprising:

means for venting controllable quantities of cabin air to the atmosphere;

a source of oxygen-rich air;

means for monitoring the partial pressure of carbon dioxide in the cabin air;

means for monitoring the partial pressure of oxygen in the cabin air;

means for monitoring the humidity of the cabin air;

means for monitoring the total air pressure of the cabin air; and an air quality controller including inputs each connected to respective means for monitoring, and at least two outputs, one output connected in controlling relationship to the source of oxygen-rich air and another connected in controlling relationship to the cabin air recirculating system, the air quality controller being operable to determine a passenger discomfort level function value by combining the inputs of the means for monitoring and, upon detecting a specified function value for passenger discomfort, to actuate an output to enable at least one of:

the source of oxygen rich air to increase the partial pressure of oxygen in the cabin air, and the recirculating system to increase the introduction of fresh outside air and thereby reduce the partial pressure of carbon dioxide in the cabin air.

15. The system for controlling the quality of the cabin air as set forth in claim 14, wherein the air quality controller further includes a third output and means responsive to the third output for increasing the cabin air humidity when the monitored humidity falls below a predetermined minimum.

16. The system for controlling the quality of the cabin air as set forth in claim 14, wherein the source of oxygen-rich air comprises a molecular sieve for separating oxygen from other gaseous atmospheric components.

17. The system for controlling the quality of the cabin air as set forth in claim 14, further including means coupled to the means for venting and responsive to the monitored total air pressure of the cabin air to modify the quantity of air vented to the atmosphere to maintain the total cabin air pressure within prescribed limits.

18. The system for controlling the quality of the cabin air as set forth in claim 14, wherein the air quality controller enables both the source of oxygen rich air to increase the partial pressure of oxygen in the cabin air and the recirculating system to increase the introduction of fresh outside air thereby reducing the partial pressure of carbon dioxide in the cabin air, the ratio of fresh air to oxygen being proportional to the ratio of an amount by which a predetermined oxygen threshold exceeds the monitored partial pressure of oxygen divided by an amount by which the monitored carbon dioxide partial pressure exceeds a predetermined carbon dioxide threshold level.

19. The system for controlling the quality of the cabin air as set forth in claim 14, wherein the system includes means for combining recirculated air, outside air, and oxygen-rich air.

* * * * *